United States Patent [19]

Takada et al.

[11] Patent Number: 4,476,084
[45] Date of Patent: Oct. 9, 1984

[54] METHOD OF STRENGTHENING A NECK PORTION OF A BOTTLE-SHAPED CONTAINER OF BIAXIALLY ORIENTED POLYETHYLENE TEREPHTHALATE RESIN

[75] Inventors: Takuzo Takada, Tokyo; Takao Iizuka, Matsudo, both of Japan

[73] Assignee: Yoshino Kogyosho Co., Ltd., Tokyo, Japan

[21] Appl. No.: 377,956

[22] Filed: May 13, 1982

[30] Foreign Application Priority Data

May 19, 1981 [JP] Japan .............................. 56-75584[U]

[51] Int. Cl.³ ...................... B29C 25/00; B29C 17/00
[52] U.S. Cl. ................................ 264/342 R; 264/40.6;
264/520; 264/521; 264/230; 264/235; 264/237;
264/346; 264/348
[58] Field of Search ............... 264/520, 521, 230, 235,
264/237, 296, 346, 348, 523, 40.6, 342 R;
425/526

[56] References Cited

U.S. PATENT DOCUMENTS 3,562,372 2/1971 Schjeldahl et al. ................. 264/520
4,375,442 3/1983 Ota et al. ......................... 264/520 X
4,385,089 5/1983 Bonnebat et al. ............... 264/523 X Primary Examiner—Jan Silbaugh
Attorney, Agent, or Firm—Parkhurst & Oliff

[57] ABSTRACT

A method of strengthening the neck portion of a hollow blow-molded bottle-shaped container of a biaxially oriented polyethylene terephthalate resin, which has the steps of heating the neck portion from 140° to 170° C., inserting a die pin of a predetermined shape into the opening of the neck portion, blowing cooling air to the neck portion, thereby shrinking and whitening the neck portion. Thus, the method prevents improper shrinkage deformation of the neck portion due to the thermal influence of the bottle-shaped container.

11 Claims, 1 Drawing Figure

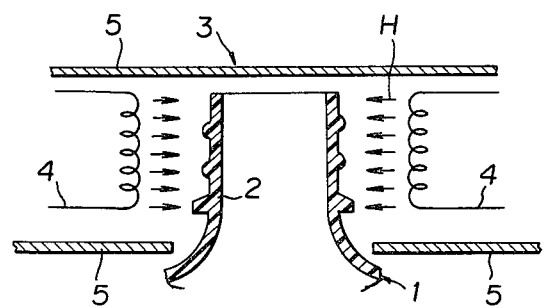
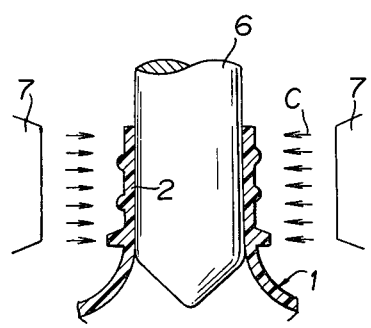

METHOD OF STRENGTHENING A NECK PORTION OF A BOTTLE-SHAPED CONTAINER OF BIAXIALLY ORIENTED POLYETHYLENE TEREPHTHALATE RESIN

BACKGROUND OF THE INVENTION

The present invention relates to a method of strengthening the neck portion of a hollow blow-molded bottle-shaped container of a biaxially oriented polyethylene terephthalate resin.

A hollow blow-molded bottle-shaped container of a biaxially oriented polyethylene terephthalate resin, abbreviated hereinafter to as "a PET", has excellent physical properties, and durability, and a wide range of applications. However these excellent properties such as superior physical properties, durability, etc. of the bottle-shaped container can be partly performed effectively only after the resin material is biaxially oriented.

For example, some of the physical properties and the durability of the neck portion of the bottle-shaped container which were blow-molded without almost being oriented at the time of molding were deteriorated compared with the body and the like of the bottle-shaped container which had been sufficiently oriented at that time.

The representative example of such a drawback of the conventional blow-molded bottle-shaped container exists in the fact that, when highly concentrated alcohol is contacted with the neck portion of such a bottle-shaped container, the contacting alcohol impregnates into the wall of the neck portion, resulting in white opacification of the neck portion due to crazing.

One method proposed for obviating this drawback in the conventional blow-molded bottle-shaped container of a biaxially oriented PET described above is to enhance the density of resin material by opacifying the material in white by utilizing the whitening phenomenon due to the crystallization of the resin material by heat treating the neck portion of the bottle-shaped container.

This method of strengthening the neck portion of the bottle-shaped container of the PET described above can greatly increase the craze resistance of the neck portion, improving the mechanical rigidity and producing other excellent effects such as impact resistance, wear resistance, and external pressure resistance of the bottle-shaped container. However, previously the neck portion of the bottle-shaped container thus strenghtened has always been thermally shrunk due to the influence of the heat treatment applied to whiten the resin material of the neck portion of the bottle-shaped container. Sometimes the neck portion is disadvantageously deformed due to the thermal shrinkage.

More particularly, the neck portion of the conventional bottle-shaped container of the PET described above of this type does not always have a uniform thickness at the peripheral wall due to the formation of a spiral thread or of a collar on the outer peripheral surface, nor been uniformly heated over the entire portion, nor been uniformly cooled simultaneously as a whole. Consequently shrinkage deformation of the neck portion does not always occur uniformly due to the thermal influence caused at the neck portion, sometimes causing the drawbacks and disadvantages of the loss of the circularity at the neck portion of the bottle-shaped container, and/or the loss of the flatness at the upper end face of the neck portion.

SUMMARY OF THE INVENTION

Accordingly, an object of the present invention is to provide a method of strengthening the neck portion of a hollow blow-molded bottle-shaped container of a biaxially oriented polyethylene terephthalate resin in which all the aforementioned drawbacks and disadvantages of the conventional bottle-shaped container can be eliminated to prevent improper shrinkage deformation of the neck portion due to the thermal influence applied externally when the neck portion is heat treated for strengthening by the opacification of the container in white.

Another object of the present invention is to provide a method of strengthening the neck portion of a hollow blow-molded bottle-shaped container of a biaxially oriented PET which can perform the steps of heat treating and molding the neck portion in about the same number of steps as the conventional method merely by adding the step of inserting a die pin into the bore of the neck portion of the bottle-shaped container.

BRIEF DESCRIPTION OF THE DRAWINGS

The above and other related objects and features of the invention will be apparent from a reading of the following description of the disclosure found in the accompanying drawing and the novelty thereof pointed out in the appended claims.

The single FIGURE is a schematic side sectional flowchart of the steps for strengthening the neck portion of the bottle-shaped container according to the present invention.

DESCRIPTION OF THE PREFERRED EMBODIMENTS

Reference is now made to the accompanying drawing, which shows a preferred embodiment of a method for strengthening the neck portion of a hollow blow-molded bottle-shaped container of a biaxially oriented polyethylene terephthalate resin according to the present invention.

The method of strengthening the neck portion of the bottle-shaped container of the biaxially oriented PET according to the present invention comprises the steps of heating the neck portion 2 of the blow-molded bottle-shaped container 1 of biaxially oriented PET at approximately 140° to 170° C. at H in the FIGURE, inserting a die pin 6 having a cooling function and a cylindrical shape with an outer diameter slightly smaller than the bore of the neck portion 2 in the bore of the neck portion 2 thus heated, shrinking the neck portion 2 by blowing chilled gas or air onto the outside of neck portion 2 from to bring the neck portion into contact with the outer periphery of the die pin 6, and gradually cooling the neck portion 2 to opacify the neck portion 2 in white at C in the FIGURE, thereby increasing the density of the resin material of the neck portion 2 to strengthen the neck portion 2.

Heating means for the neck portion 2 may include a variety of methods. In the embodiment exemplified in the FIGURE, a heating furnace 3 which thermally contains a heater 4 is provided in a frame wall 5 in such a manner that only the neck portion 2 of the bottle-shaped container 1 can invade or be inserted into the furnace 3. The heating furnace 3 may also contain a blower for blowing cooling gases onto the outside of neck portion 2. The bottle-shaped container 1 is moved at a predetermined constant speed in rotation around its own axis so that the neck portion 2 is disposed within the furnace 3, and the entire neck portion 2 is heated uniformly at approx. 140° to 170° C.

The heating temperature for the neck portion 2 may be determined by using the requisite temperatures for whitening the PET material of the neck portion of the bottle-shaped container as a criterion. The heating temperatures for the neck portion 2 may also be predetermined on the basis of the thickness and the like of the neck portion 2 of the bottle-shaped container 1. The neck portion 2 is heated to an accurate temperature by controlling the moving speed and the like of the bottle-shaped container 1, the supplied electric power to the heater 4, etc.

When the neck portion 2 has been heated to a predetermined temperature in the heated furnace 3, the neck portion 2 is then gradually cooled to a state such that when the die pin 6 is inserted into the bore of the neck portion 2 and chilled or cooled air is blown onto the neck by a blower 7, together with the die pin 6, the resin material of the neck portion 2 is thus whitened and accordingly strengthened. The neck portion 2 is cooled by the die pin 6 and the chilled or cooled air in a period of time, approximately 20 to 25 seconds.

Although the cooling of the neck portion 2 with the die pin 6 and the chilled air described above may be gradual cooling of the PET at the cooling speed the cooling amount and speed are not critical.

The die pin 6 may preferably have a cylindrical shape substantially or slightly smaller than the bore of the neck portion 2 before of the heat treatment. The die pin 6 also may have a cooling function by utilizing means for circulating and supplying cooling fluid thereinto, etc. The outer diameter of the die pin 6 is set adaptively for the bore and the thickness of the neck portion 2 of the bottle-shaped container 1 thus formed.

That is, since the neck portion 2 of the bottle-shaped container of the PET described above is slightly thermally shrunk by this heat treatment, the outer diameter of the die pin 6 is set to fit snugly into the opening of the neck portion 2 thus heat treated.

Therefore, the outer diameter of the die pin 6 is slightly larger than the bore of the opening of the neck portion 2 thus heat treated without the die pin 6, after cooling and solidification.

Inasmuch as the outer diameter of the die pin 6 to be inserted into the neck portion 2 of the bottle-shaped container 1 may be slightly larger than the bore of the neck portion 2 shrunk by the cooling and solidifying without the die pin 6, due to the shrinkage of itself the neck portion 2 can be formed to the final shape by being urged by the die pin 6.

Since the die pin 6 is formed in a regularly circular section of a cylindrical shape in this case, the neck portion 2 thus shrunk is formed in the cylindrical shape having a regularly circular section in accordance with the shape of the die pin 6, thus snugly fitted into the opening of the neck portion 2.

Since the sectional shape of the neck portion 2 is thus formed in a regularly circular shape, the upper end face of the neck portion 2 should accordingly be held in a flat surface on the upper surface of the neck portion 2 with the result that the neck portion 2 is thermally shrunk so that the sectional shape at the time of injection molding is accurately maintained, thereby eliminating the improper strain or deformation due to the thermal shrinkage.

Since the neck portion 2 is shrunk so that the die pin 6 is tightened as described above, the tightening of the die pin 6 by the neck portion 2 becomes very strong.

Therefore, it is preferred in order to remove readily the die pin 6 from the opening of the neck portion 2 after the neck portion 2 is thermally shrunk, i.e., to smoothly remove the die pin from the neck portion 2, the outer peripheral portion of the die pin 6 facing the inside surface of the neck portion 2 has a tapered tip.

As described fully in the foregoing description, the neck portion 2 may undergo thermal shrinkage deformation when heat treated. To enhance the physical properties and mechanical properties of the neck portion 2 of the bottle-shaped container 1 of the PET the resin density is increased with the die pin 6 thus inserted into the opening of the neck portion 2 according to the present invention. The neck portion 2 is heat treated without improper deformation and thermally shrunk and formed. Hence the improper deformation of the neck portion 2 upon thermal shrinkage thus applied can be effectively prevented. Since the method of the present invention performs by adding only the step of inserting the die pin 6 into the opening of the neck portion 2, the method of the invention can perform the neck portion 2, having excellent properties substantially in about the same number of steps and in the same period of time as the conventional method in the steps of heat treating and forming the neck portion 2 of the bottle-shaped container 1.

What is claimed is:

1. A method of strengthening a neck portion, having a bore therethrough, of a bottle-shaped container of biaxially oriented polyethylene terephthalate resin comprising the steps of:
   heating the neck portion of said bottle-shaped container to approximately 140° to 170° C.,
   inserting a die pin of a cylindrical shape having an outer diameter substantially smaller than the bore of the neck portion into the neck portion thus heated, and
   blowing cooling gas onto the outside of the neck portion to shrink and bring the neck portion into contact with the outer periphery of the die pin,
   gradually cooling the neck portion to opacify the neck portion, and
   removing the die pin from the neck portion.

2. The method according to claim 1, wherein said die pin has an outer diameter smaller than the bore of the neck portion before said neck portion is heated.

3. The method according to claim 1 or claim 2, wherein the outer diameter of said die pin is larger than the bore of the neck portion after the neck portion has been cooled and the die pin has been removed.

4. The method according to claim 1, wherein said die pin has a cooling function.

5. The method according to claim 4, wherein said die pin has means for circulating cooling fluid therethrough.

6. The method according to claim 1, wherein said die pin has a tapered tip which is inserted into the bore of the neck portion.

7. The method according to claim 4, wherein the neck portion is cooled by said die pin and by the cooling gas over a period of about 10 to 25 seconds.

8. The method according to claim 1, wherein the neck portion is heated by a furnace which contains a heater and a blowing means, said furnace being so structured that only the neck portion of said bottle-shaped container can be inserted into the furnace.

9. The method according to claim 8, wherein the bottle-shaped container is moved through the furnace at a predetermined speed.

10. The method according to claim 9, wherein the temperature to which the neck portion is heated is controlled by regulating electric power supplied to the furnace and said predetermined speed.

11. A method of strengthening a neck portion, having a bore therethrough, of a bottle-shaped container of biaxially oriented polyethylene terephthalate resin comprising the steps of:

heating the neck portion of said bottle-shaped container to approximately 140° to 170° C., inserting a die pin of a cylindrical shape having an outer diameter smaller than the bore of the neck portion into the neck portion thus heated, and blowing cooling gas onto the outside of the neck portion to shrink the neck portion into contact with the outer periphery of the die pin and simultaneously opacify said neck portion, and removing the die pin from the neck portion.

* * * * *